United States Patent [19]

Pomerenke

[11] Patent Number: 4,617,713
[45] Date of Patent: Oct. 21, 1986

[54] NURSERY POT CUTTING TOOL

[75] Inventor: David E. Pomerenke, Shakopee, Minn.

[73] Assignee: Creative Landscape Service, Inc., Shakopee, Minn.

[21] Appl. No.: 754,758

[22] Filed: Jul. 15, 1985

[51] Int. Cl.[4] .............................................. B23P 19/02
[52] U.S. Cl. .................................... 29/426.4; 30/116; 414/412
[58] Field of Search ................ 30/116, 165; 29/426.4; 414/412; 47/58

[56] References Cited

U.S. PATENT DOCUMENTS

| 777,771 | 12/1904 | Bettis . | |
|---|---|---|---|
| 1,197,553 | 9/1916 | Schumacher et al. | 30/116 X |
| 1,521,368 | 12/1924 | Hamersley | 30/165 X |
| 2,759,261 | 8/1956 | Setecka . | |
| 2,771,872 | 11/1956 | Bergling . | |
| 2,968,124 | 1/1961 | Coplen . | |
| 3,310,082 | 3/1967 | De La Tramerye . | |
| 3,705,659 | 12/1972 | Mackie . | |

Primary Examiner—Frank T. Yost
Attorney, Agent, or Firm—Orrin M. Haugen; Thomas J. Nikolai

[57] ABSTRACT

A tool for facilitating the removal of temporary fiber or plastic film pots from shrubs or other nursery products. The tool comprises an elongated rod having a spike tip at one thereof and a gripping handle integrally formed at the other end. A thin flexible strand or cable is connected at one end proximate the spike tip. The cable has a pull ring or other type of handle to facilitate the gripping thereof. In use, the cable or strand is first aligned with the rod and the spiked end is pushed downward into the root ball next to the side wall of the container in which the plant has been growing. While pushing down on the handle portion of the rod with one hand, the operator grips the ring at the free end of the cable and pulls outwardly and downwardly to cause the cable to cut through the side wall of the container, allowing it to be spread open and the plant to be removed with the root ball generally intact.

1 Claim, 2 Drawing Figures

NURSERY POT CUTTING TOOL

BACKGROUND OF THE INVENTION

I. Field of the Invention:

This invention relates generally to cutting tools, and more specifically to the design of a tool especially for use by nurserymen to facilitate the removal of a plant from its temporary fiber container prior to its being planted in the ground.

II. Discussion of the Prior Art:

It is common practice for nursery goods to be planted in temporary fiber pots or film bags or wrappings where they are allowed to grow until the plant is purchased and is to be permanently planted in the ground. It is, of course, generally desirable to remove the plant and its root ball from the temporary pot or container without unduly disturbing the root ball. As used herein, the term "pot" is used in its general sense as a container for the roots and soil of nursery stock and it is not intended to be limited to any particular shape.

A common type of temporary pot is fabricated from a heavy fibrous paper-like material and, in the past, various tools have been used to remove the pot prior to planting. Typically, a razor knife, a shears or some other type of cutting tool or a sharpened shovel have been utilized. Razor knives are not particularly suitable because of the abrasive nature of the materials being cut, all of which tends to dull the knife within a few uses thereof. Shears or a sharp spade tend to disturb the root ball so that when the fiber pot is ultimately cut through and removed, the dirt falls free from the root structure which can adversely impact the viability of the plant.

The Coplen U.S. Pat. No. 2,968,124 describes a plant container which is designed to be readily split apart to facilitate its removal at the time of planting of the nursery goods. In accordance with this patent, the temporary pot is designed to have a readily releasable seam extending throughout the height dimension of the pot so that the pot can be peeled away from the root ball by breaking the seam. As shown in the drawing, a pull cord 17 is stapled to the side wall of the container with the staples extending through to join split edges of the pot. By pulling on the cord, the staples are extracted, allowing the pot edges to separate.

The present invention offers significant advantages over the arrangement shown in the Coplen patent. First of all, the tool of the present invention can be used with any paper/fiber pot or polyethylene bag and that pot or bag does not have to be specially designed and manufactured.

SUMMARY OF THE INVENTION

In accordance with the present invention, the plant container cutting tool comprises a metal rod or stake which may typically be about one-fourth inch in diameter and which is provided with a somewhat pointed tip at its distal end. The upper or proximal end of the rod is bent at a right angle to the main shaft to provide a handle grip. Attached to the lower, pointed end of the rod or spike is a length of flexible monofilament, cord or cable which may be about equal in length to the rod. The strand or cable is otherwise free of the rod and has a pull-ring or other grip member at its upper or free end.

In use, the cable is generally aligned with the rod and the user pushes the pointed end of the rod into the pot or plant container immediately adjacent the inner side wall thereof until the point reaches the bottom of the container. Next, while firmly gripping the handle portion of the rod with one hand, the other hand is used to pull on the ring or handle member of the strand or cable in an outward and downward direction causing the cable to cut through the fibrous paper or film wall of the container. Once the container is cut in this fashion, it is simple to remove the plant with its root ball intact.

OBJECTS

It is a principal object of the present invention to provide a new and improved tool for facilitating the removal of temporary pots from trees, shrubs, flowers and other nursery stock.

Another object of the invention is to provide a tool for cutting through the side wall of a temporary growing pot so that it can be readily removed prior to the permanent planting of the shrub or flower.

Still another object of the invention is to provide a nurseryman's tool which is inexpensive to manufacture, easy to carry and use and sufficiently durable to last for many years of daily use.

Still another object of the invention is to provide a nurseryman's pot cutting tool which is effective to facilitate the removal of the pot without disturbing the root structure of the plant.

These and other objects and advantages of the invention will become apparent to those skilled in the art from the following detailed description of the preferred embodiment, especially when considered in conjunction with the accompanying drawings in which like numerals in the several views refer to corresponding parts.

DESCRIPTION OF THE PREFERRED EMBODIMENT

Figures 1, 2:
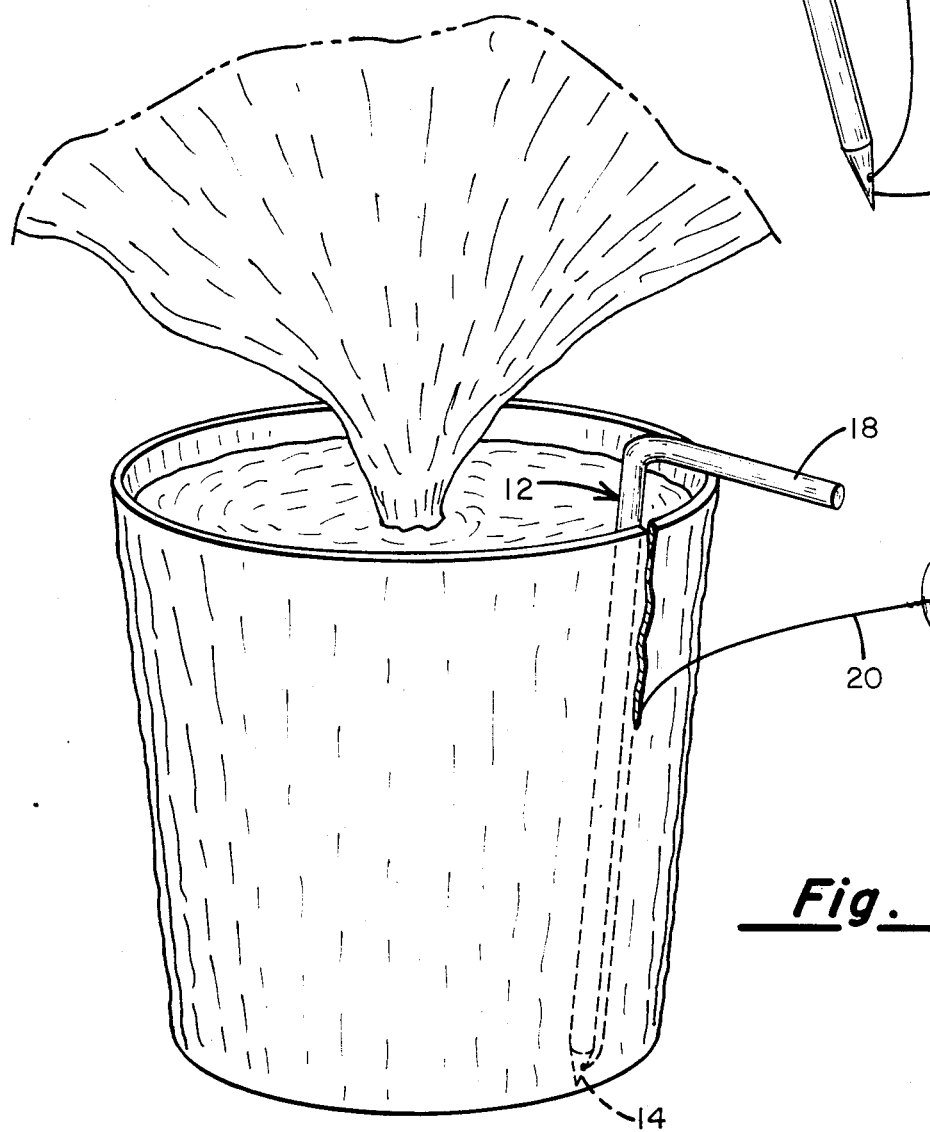
FIG. 1 is a perspective view showing the constructional features of the preferred embodiment.
FIG. 2 is a drawing showing the manner of use of the tool of FIG. 1.

Certain teminology will be used in the following description for convenience in reference only and should not be construed as limiting. The words "upwardly", "downwardly", "rightwardly" and "leftwardly" will refer to directions in the drawings to which reference is made. The words "inwardly" and "outwardly" will refer to directions toward and away from, respectively, and geometric center of the device and associated parts thereof. This terminology is intended to include the words specifically mentioned above, derivatives thereof as well as words of similar import.

Referring to FIG. 1, there is shown a perspective view of the pot cutting tool of the present invention. The tool is indicated generally by numeral 10 and is seen to comprise a rod or stake member 12 having a point at its lower end 14 and toward the upper end at 16, the rod is bent at a right angle to provide a convenient gripping area 18.

Suitably attached to the lower pointed end of the rod 12 is a flexible strand which may comprise woven wire cable 20. It is to be understood, however, that a plastic monofilament, a cord, a wire or other like member may be used in place of the cable 20. The cable is approximately equal in length to the unbent portion of the rod 12 and is provided with a pull member 22 which may take the form of a closed ring attached at its free or upper end.

With no limitation intended, for most fiber nursery pots or plastic film bags in which plants are initially packaged, if the rod 12 is formed from cold rolled steel and has a diameter of about three-eighths inch and is in the range of from 12 to 24 inches in length between the pointed end 14 and the bend 16, the tool can be used to facilitate removal of most pot sizes commonly used in holding nursery stock. The cable should be as thin as practical while still possessing sufficient strength to pass through the side wall of the fiber pot without breaking.

Referring to FIG. 2, a cut is made through the side wall of the fiber pot by first jamming the pointed end 14 of the rod or spike 12 into the soil surrounding the roots of the plant at a location immediately adjacent the side of the pot. While holding onto the handle portion 18 of the rod so as to steady the pot and to hold the rod in position, a finger is looped through the pull member 22 and the strand or cable is pulled outwardly and downwardly so that it cuts down through the material comprising the pot to a desired extent so that the pot can be spread free of the root ball. Because the tool is initially inserted next to the side wall, the cohesiveness of the soil about the plant's roots is not disturbed and will hold the shape of the pot even when the pot is removed at the time of planting.

This invention has been described herein in considerable detail, in order to comply with the patent statutes and to provide those skilled in the art with information needed to apply the novel principles, and to construct and use such specialized components as are required. However, it is to be understood that the invention can be carried out by specifically different equipment and devices, and that various modifications, both as to equipment details and operating procedures can be effected without departing from the scope of the invention itself.

What is claimed is:

1. The method of removing a temporary fiber growing pot from nursery stock prior to planting, comprising:
    (a) inserting an elongated, rigid rod having a flexible strand secured to the lower end thereof downward into the soil next to the sidewall of said pot;
    (b) pulling outward and downward on said strand while holding said rod in position with sufficient force to cause said strand to cut through said sidewall; and
    (c) spreading and removing the cut pot from around the root ball of said nursery stock.

* * * * *